United States Patent [19]

Horey

[11] 4,354,442
[45] Oct. 19, 1982

[54] METHOD FOR STORING SEWING MACHINE STITCH PATTERN DATA IN A BYTE ORGANIZED MEMORY

[75] Inventor: Leonard I. Horey, West Orange, N.J.

[73] Assignee: The Singer Company, Stamford, Conn.

[21] Appl. No.: 199,147

[22] Filed: Oct. 22, 1980

[51] Int. Cl.³ .................. D05B 3/02; G05B 19/18
[52] U.S. Cl. .................. 112/158 E; 364/900; 364/130
[58] Field of Search .......... 112/158 E, 121.11, 121.12; 364/100, 107, 200, 300, 900

[56] References Cited

U.S. PATENT DOCUMENTS

| | | | |
|---|---|---|---|
| 3,811,115 | 5/1974 | Cordi | 364/900 |
| 4,031,515 | 6/1977 | Kashio | 364/200 |
| 4,275,674 | 6/1981 | Carbonato et al. | 112/158 E |

Primary Examiner—Peter P. Nerbun
Attorney, Agent, or Firm—David L. Davis; Robert E. Smith; Edward L. Bell

[57] ABSTRACT

An arrangement for storing groups of twelve data bits in an eight bit byte organized memory utilizes three bytes for storing two groups of bits.

8 Claims, 2 Drawing Figures

METHOD FOR STORING SEWING MACHINE STITCH PATTERN DATA IN A BYTE ORGANIZED MEMORY

DESCRIPTION

Background of the Invention

This invention relates to the storage of sewing machine stitch pattern data and, more particularly, to the efficient storage of such data in a byte organized memory.

U.S. Pat. No. 3,855,956 discloses a system for the electronic control of a sewing machine to effect pattern stitching. For each stitch, this system utilizes five bits of data to control feeding of the work fabric and five bits of data to control the amount of lateral jogging (bight) imparted to the needle. Thus, for each stitch forming cycle, the sewing machine utilizes ten bits of data. This data is stored in a read only memory (ROM) organized to store ten bits of stitch pattern data at each memory address. A subsequent version of the sewing machine disclosed in U.S. Pat. No. 3,855,956 utilizes eleven bits of data for each stitch forming cycle, the eleventh bit being a control bit, as disclosed for example, in U.S. Pat. No. 4,159,688. In any event, both of these patents disclose the storage of stitch pattern data in a custom designed ROM which is organized so that the length of each word in the memory is equal to the total number of bits of data stored for each stitch.

The aforedescribed memory organization is very efficient if a custom designed ROM is utilized because for every stitch forming cycle of the sewing machine, only a single word is extracted from the memory and every bit position within that word is utilized. However, in recent years the use of standard single chip microcomputers has gained in popularity and hence the cost has decreased. It would therefore be desirable to be able to utilize a standard high volume commercially available microcomputer in place of a custom chip. However, commercially available microcomputers with their associated ROMS have memory space and other portions thereof organized to handle words having lengths which are multiples of four bits. The most popular microcomputers and ROMS are organized to handle bytes of eight bits, each of which is not enough to accommodate the required number of data bits for each stitch of an electronically controlled stitch pattern sewing machine.

It is therefore an object of this invention to provide an arrangement whereby a standard eight bit microcomputer may be utilized for controlling a stitch pattern sewing machine.

One way to use an eight bit microcomputer is to devote alternate memory addresses to the storage of feed information and the remaining addresses to the storage of bight information. This leaves three unused bit positions at each memory address, and while it is possible to utilize some of these bit positions for control bits, it is unnecessary to use all of them for that purpose. The ratio of utilized bit positions to total bit positions is one measure of the efficiency of use of a memory and the efficiency of a ROM used this way is consistently lower than that of a custom ROM in the manner described above.

It is therefore a more specific object of this invention to efficiently utilize an eight bit memory for storing sewing machine stitch data.

SUMMARY OF THE INVENTION

The foregoing and additional objects are attained in accordance with the principles of this invention by utilizing a memory organized as eight bit bytes and assigning three bytes to store the data for two stitches. Accordingly, five bits of feed data, five bits of bight data and two control bits are stored in one and a half memory bytes. An efficient packing of the memory is therefore achieved.

BRIEF DESCRIPTION OF THE DRAWINGS

The foregoing will be more readily apparent upon reading the following description in conjunction with the drawings in which.

DETAILED DESCRIPTION

Figure 1:
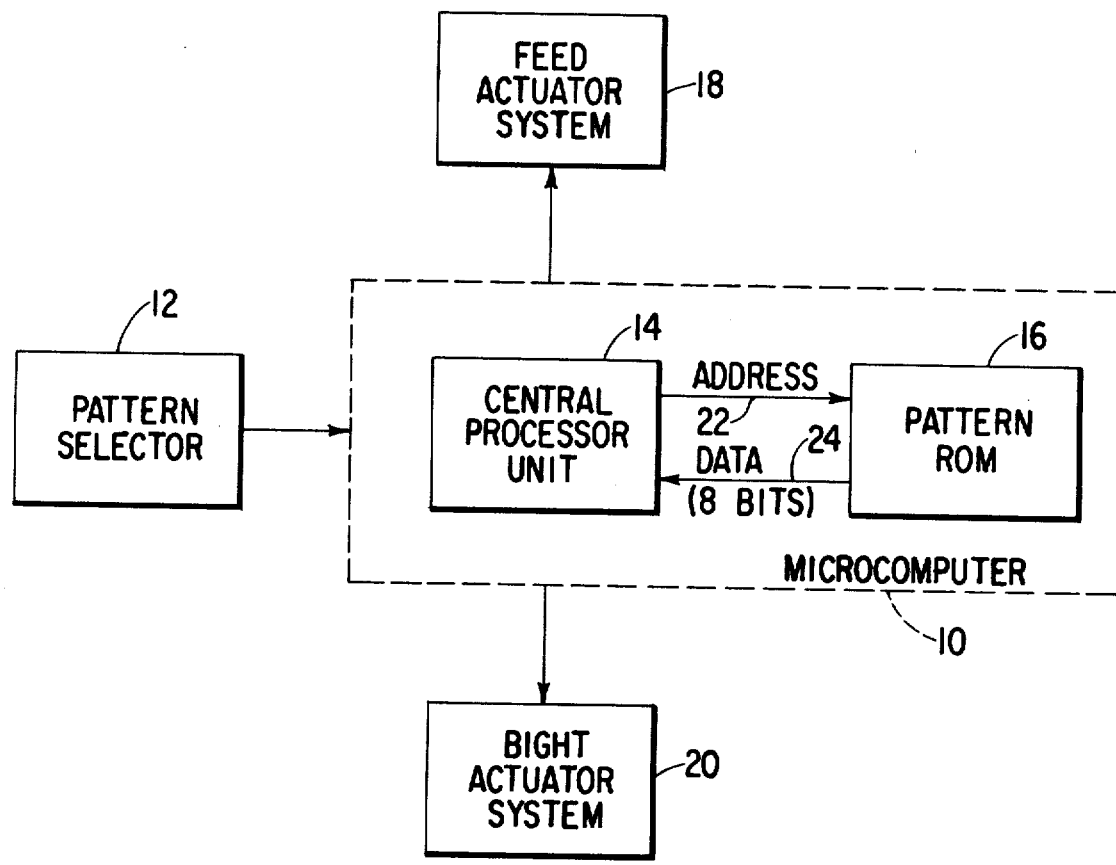
FIG. 1 illustrates a general block diagram of a microcomputer controlled pattern stitch sewing machine.

FIG. 1 shows a general block diagram of a microcomputer based controlled for an electronic stitch pattern sewing machine illustratively of the type disclosed in U.S. Pat. No. 4,159,688, which issued on July 3, 1979, to Garron et al, the disclosure of which is hereby incorporated by reference. Accordingly, the microcomputer 10 receives input signals from the pattern selector 12 indicative of which pattern the sewing machine operator desires to be sewn. The microcomputer 10 includes an internal central processor unit (CPU) 14 and a pattern ROM 16. The CPU 14 obtains from the pattern ROM 16, in timed relation with the operation of a sewing machine, data for controlling the feed actuator system 18 and the bight actuator system 20. The feed actuator system 18 and the bight actuator system 20 are similar in construction and are adapted to convert a digital code word from the microcomputer 10 into a mechanical position which locates the sewing machine needle in a conventional stitch forming instrumentality and provides a specific work feed for each needle penetration.

Figure 2:
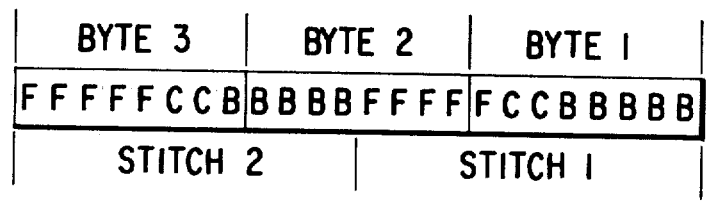
FIG. 2 illustrates the packing of stitch pattern data in an eight bit byte organized memory in accordance with the principles of this invention.

Illustratively, the microcomputer 10 is a type R6500 microcomputer manufactured by Rockwell International Corporation. The central processor unit 14 provides addresses to the pattern ROM 16 over the leads 22 and receives in return eight bit bytes of data over the leads 24. FIG. 2 illustrates how twelve bits of stitch pattern data are stored in the ROM 16. In order to simplify the description, the bits of data that relate to one of the stitch parameters, such as the bight, will be referred to as a first ordered set of five bits and the bits of information that relate to the other stitch parameter, such as feed, will be referred to as a second ordered set of five bits. There is a plurality of groups of the first and second sets of data bits and during each operative cycle of the sewing machine, a single group, including a first and second set of data bits, are retrieved from the ROM 16. The ROM 16 is organized in a conventional manner with a plurality of memory addresses, each of which has storage space for an ordered eight bit byte ranging from the least significant bit to the most significant bit. Each of the first and second sets of data bits is ordered, i.e., it has a least significant bit and a most significant bit with the intermediate bits being arranged in order of significance between the least significant bit and the most significant bit. In addition to the first and second sets of data bits, there is a third set of data bits which are control bits which contain information for controlling the sewing machine. For example, the control bits may indicate the last stitch in a pattern or may be recycling bits for looping through the pattern information.

Referring now to FIG. 2, illustrated therein are three eight bit bytes, denominated Byte 1, Byte 2 and Byte 3. The individual bytes are arranged with their least significant bit on the right and their most significant bit on the left. The ordered bits of data corresponding to bight information are indicated by "B", with the least significant bit being at the right and the most significant bit being at the left. The ordered bits of data corresponding to the feed information are indicated by "F", with the least significant bit being at the right and the most significant bit being at the left. The control bits are indicated by "C". As illustrated in FIG. 2, three bytes of ROM memory are utilized for storing data corresponding to two stitches. The first byte stores the bight data for the first stitch, the control bits for the first stitch and the least significant bit of the feed data for the first stitch. The second byte stores the four most significant bits of the feed data for the first stitch and the four least significant bits of bight data for the second stitch. The third byte stores the most significant bit of the bight data for the second stitch, the control bits for the second stitch and the five feed data bits for the second stitch.

The Appendix to this specification illustrates a subroutine for the microcomputer 10 for retrieving stitch pattern data from the ROM 16. The first part of the program responds to an input pattern number from the pattern selector 12 to access a pattern address table in order to find the address of the first word storing data for the selected pattern. Within the pattern ROM 16, each byte is divided into a low nibble which is the four least significant bits of the byte and a high nibble which is the four most significant bits of the byte. The program then determines whether the data starts in the low nibble portion (i.e., Stitch 1 begins in the low nibble of Byte 1) or the high nibble (i.e., Stitch 2 begins in the high nibble of Byte 2). The data bits are then retrieved from the pattern ROM and separated and reordered as feed and bight data for transmission to the feed actuator system 18 and the bight actuator system 20, respectively.

The particular data packing arrangement shown herein was chosen for ease of data extraction and reordering so that a minimum of logical manipulation of the data bits is required. From the program listing in the Appendix, it is noted that the bight and feed data bits are obtained from the retrieved bytes simply by masking and shifting operations. The symmetry of the packing minimizes the required number of operations.

Accordingly, there has been disclosed a method for efficiently packing a byte organized memory with sewing machine stitch data. It is understood that the above-described embodiment is merely illustrative of the application of the principles of this invention. Numerous other embodiments may be devised by those skilled in the art without departing from the spirit and scope of this invention, as defined by the appended claims. For example, although a programmed microcomputer has been disclosed, this invention may also be utilized with a hard wired processor.

APPENDIX

| LABEL | INSTR. | MODIFIER | COMMENTS |
|---|---|---|---|
| THIS ROUTINE GETS THE BIGHT DATA, CONTROL INFORMATION (EOP & RECYC), AND FEED DATA FOR THE STITCH NUMBER SPECIFIED BY 'STNO' (0 IS THE FIRST STITCH). EACH STITCH DATA GROUP (BIGHT, CONTROL, & FEED DATA) OCCUPIES 1.5 BYTES. IT IS ASSUMED THAT NO PATTERN HAS MORE THAN 170 STITCHES. | | | |
| | LDA | PATNO | |
| | ASL | A | PATTERN NUMBER * 2 |
| | TAX | | |
| | LDA | PATTAB,X | PATTERN ADDRESS TABLE |
| | STA | IABUF | |
| | INX | | |
| | LDA | PATTAB,X | |
| | STA | IABUF+1 | INDIRECT ADDRESS BUFFER |
| | LDA | STNO | |
| | LSR | A | |
| | CLC | | |
| | ADC | STNO | A=INT(STNO*1.5) |
| | TAY | | |
| IABUF POINTS TO THE START OF THE PATTERN | | | |
| | LDA | #0 | |
| | STA | EOP | |
| | STA | RECYC | |
| | LDA | STNO | |
| | AND | #$01 | |
| | BEQ | LOWST | DATA STARTS WITH LOW NIBBLE |
| DATA STARTS IN THE HIGH NIBBLE | | | |
| | LDA | (IABUF),Y | GET THE DATA |
| | PHA | | |
| | INY | | |
| | LDA | (IABUF),Y | |
| | LSR | A | SHIFT OUT MSB OF BIGHT DATA |
| | TAY | | |
| | PLA | | |
| | ROR | A | PICK UP MSB OF BIGHT DATA |
| | LSR | A | SHIFT BIGHT DATA INTO PLACE |
| | LSR | A | |
| | LSR | A | |
| | STA | BREG1 | |
| | TYA | | |
| | LSR | A | |
| | ROL | RECYC | |
| | LSR | A | |
| | ROL | EOP | |
| | STA | FREG2 | |
| | JMP | BCTKCK | |
| DATA STARTS IN THE LOW NIBBLE | | | |
| LOWST | LDA | (IABUF),Y | GET THE DATA |
| | TAX | | |
| | AND | #$1F | MASK OFF ALL BUT BIGHT DATA |
| | STA | BREG1 | |
| | TXA | | |
| | ASL | A | SHIFT OUT LSB OF FEED DATA |
| | TAX | | |
| | INY | | |
| | LDA | (IABUF),Y | |
| | ROL | A | |
| | AND | #$1F | PICK UP LSB OF FEED DATA |
| | STA | FREG2 | MASK OFF OTHER DATA |
| | TXA | | |
| | ROL | A | |
| | ROL | EOP | |
| | ROL | A | |
| | ROL | RECYC | |
| BCTKCK | NOP | | |

I claim:

1. In a system that utilizes a first ordered set of five bits of data to control a first function and a second ordered set of five bits of data to control a second function, wherein during each operative cycle of said system both said first and second functions are performed and wherein there is a plurality of groups of first and second sets of data bits, a method for storing the plurality of groups of first and second sets of data bits in a memory organized to store eight bit bytes of data at each address of a plurality of addresses, the method comprising the steps of:

storing the five bits of the first set of a first group in the five least significant bit locations of a first memory address;

storing one bit of the second set of the first group in the most significant bit location of the first memory address;

storing the remaining four bits of the second set of the first group in the four least significant bit locations of a second memory address;

storing four bits of the first bit of a second group in the four most significant bit locations of a second memory address;

storing the remaining bit of the first set of the second group in the least significant bit location of a third memory address; and storing the five bits of the second set of the second group in the five most significant bit locations of the third memory address.

2. The method according to claim 1 wherein the one bit of the second set of the first group stored in the most significant bit location of the first memory address is the least significant bit of the second set of the first group.

3. The method according to claim 2 wherein the bit stored in the least significant bit location of the third memory address is the most significant bit of the first set of the second group.

4. The method according to claim 1 further including the step of:

storing one bit of a third set of bits of the first group at the first memory address in a bit location intermediate the bit locations storing the five bits of the first set of the first group and the bit location storing the one bit of the second set of the first group.

5. The method according to claim 4 further including the step of:

storing one bit of a third set of bits of the second group at the third memory address in a bit location intermediate the bit locations storing the five bits of the second set of the second group and the bit location storing the remaining bit of the first set of the second group.

6. The method according to claim 1 wherein for each cycle of operation of said system there is stored a pair of control bits associated with each of said groups of first and second sets of data bits, the method further comprising the step of:

storing the control bits for each group in the bit locations intermediate the bit locations occupied by the first and second sets of data bits of that group.

7. In an electronically controlled stitch pattern sewing machine that utilizes a first set of five ordered bits of bight data for controlling lateral needle position and a second set of five ordered bits of feed data for controlling work feeding for each stitch, said sewing machine including a memory organized in addressable eight bit bytes, a method for storing the bight data and the feed data for a plurality of stitches comprising the steps of:

storing the bight data and one bit of the feed data for a first stitch in a first byte of the memory;

storing the remaining four bits of the feed data for the first stitch and four bits of the bight data for a second stitch in a second byte of the memory; and storing the remaining bit of the bight data and the feed data for the second stitch in a third byte of the memory.

8. The method according to claim 7 wherein the sewing machine utilizes two bits of control data for each stitch, the method further including the steps of:

storing the control bits for the first stitch in the first byte of the memory; and storing the control bits for the second stitch in the third byte of the memory.

* * * * *

UNITED STATES PATENT OFFICE
CERTIFICATE OF CORRECTION

Patent No. 4,354,442                    Dated Oct. 19, 1982

Inventor(s) Leonard I. Horey

It is certified that error appears in the above-identified patent and that said Letters Patent are hereby corrected as shown below:

Column 5, Claim 1, line 21, after "first", delete -- bit -- and insert -- set --.

Signed and Sealed this

Fifth Day of April 1983

[SEAL]

Attest:

GERALD J. MOSSINGHOFF

Attesting Officer    Commissioner of Patents and Trademarks